United States Patent
Kliewer

[15] 3,656,452
[45] Apr. 18, 1972

[54] TEMPERATURE SIGNALING DEVICE
[72] Inventor: George G. Kliewer, Fresno, Calif.
[73] Assignee: Dun-Rite Manufacturing Corporation
[22] Filed: June 15, 1970
[21] Appl. No.: 46,272

Related U.S. Application Data
[62] Division of Ser. No. 818,540, Apr. 23, 1969, Pat. No. 3,559,615.

[52] U.S. Cl. ............................................116/114.5, 73/358
[51] Int. Cl. ...............................................G01k 11/06
[58] Field of Search ..................116/114.5, 106; 73/358; 337/409, 410, 149

[56] References Cited

UNITED STATES PATENTS

| | | |
|---|---|---|
| 1,443,786 | 1/1923 | Dolph................................116/114.5 |
| 1,802,231 | 4/1931 | Blondin...............................73/358 X |
| 2,362,398 | 11/1944 | Pittman .............................116/114.5 |
| 3,382,840 | 5/1968 | Pabst..................................116/114.5 |

Primary Examiner—Louis R. Prince
Assistant Examiner—Daniel M. Yasich
Attorney—Naylor & Neal

[57] ABSTRACT

A torsion loaded indicating member encased within a tubular housing is released from a first orientation for rotational movement to a second orientation upon the attainment of a predetermined temperature. A fusible element is confined between the indicating member and the housing to restrain the number for movement until the element fuses at the predetermined temperature.

1 Claims, 12 Drawing Figures

PATENTED APR 18 1972

INVENTOR.
GEORGE G. KLIEWER
BY Naylor & Neal
ATTORNEYS

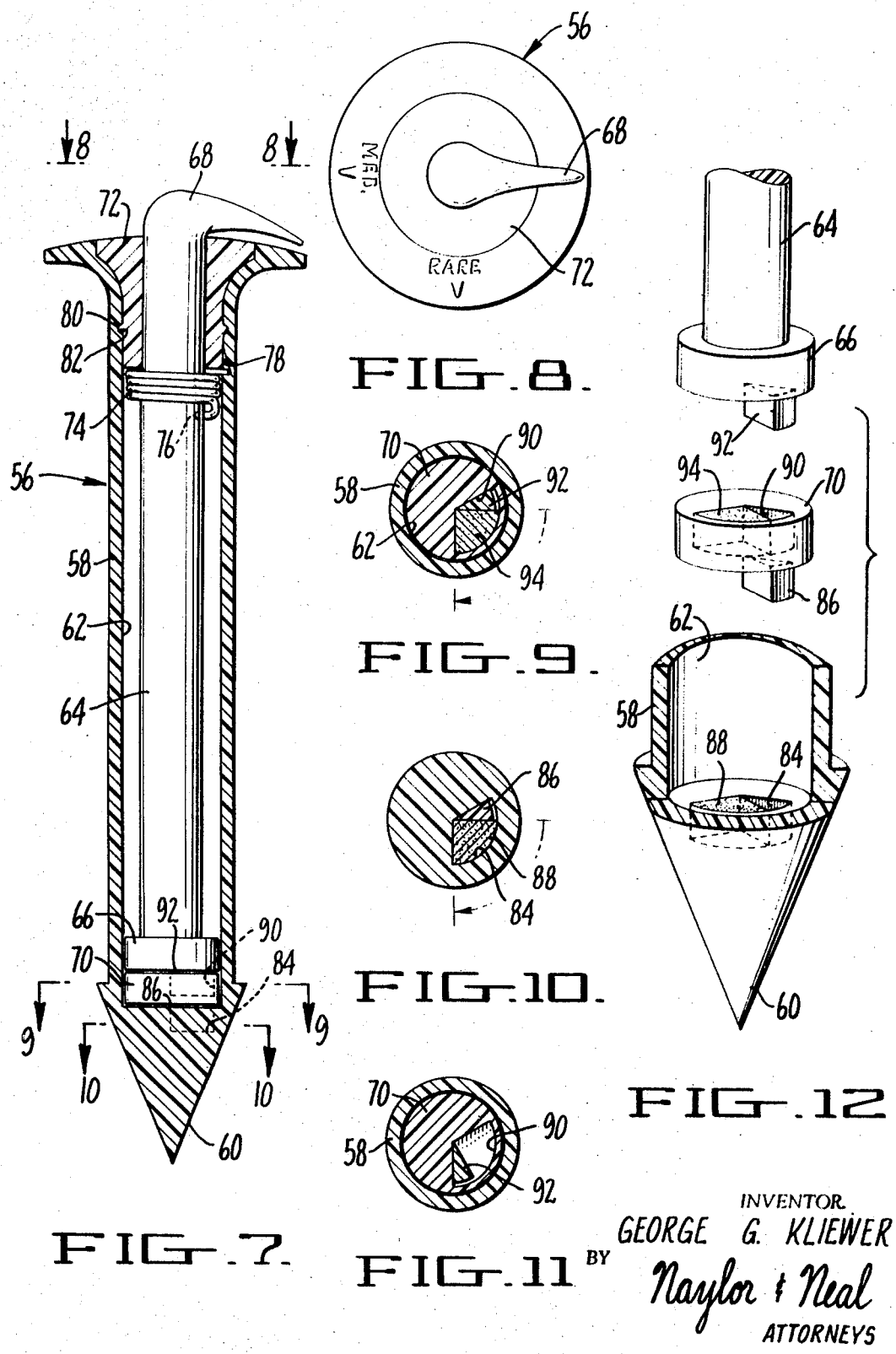

3,656,452

TEMPERATURE SIGNALING DEVICE

This application is a division of my copending application Ser. No. 818,540, filed Apr. 23, 1969, now U.S. Pat. No. 3,559,615, entitled TEMPERATURE SIGNALING DEVICE.

BACKGROUND OF THE INVENTION

The present invention relates to a temperature signaling device adapted for insertion into an article of food to indicate the attainment of a predetermined internal temperature.

Various configurations of such temperature signaling devices are known in the art. For example, such devices may be seen in my prior U.S. Pat. Nos. 3,140,611 and 3,280,629. Devices of this general type have met with substantial commercial success because of their inexpensive character, convenience and reliability. The devices are typically purchased by food distributors and inserted into their products, especially poultry, for retail distribution therewith. Due to the competitive nature of the business in which the devices are used, it is essential that they be as inexpensive as possible, while at the same time, durable and reliable in use.

SUMMARY OF THE INVENTION

In its most basic aspects, the invention is concerned with an indicating mechanism which is restrained against torsional movement relative to a housing in which it is received by a fusible locking element. The preferred embodiments employ a locking element confined between the housing and the mechanism. Upon fusion, the locking element permits the mechanism to move under the influence of a biasing means to an indicating position.

The specific embodiments of the invention employ single mechanisms, as well as plural staged mechanisms. The invention is also concerned with an improved and convenient method for forming the locking element during the assembly of the device. This method accomplishes the placement of the fusible locking element through gravitational placement of the material forming the element when it is in a melted state.

It is, accordingly, a principal object of the invention to provide a temperature signaling device employing an indicating element which is released for rotational movement responsive to a torsional force upon the attainment of a predetermined temperature.

Still another object of the invention is to provide such a device wherein a fusible member is employed to lock the indicating element against rotational movement and the force which said member is required to restrain is considerably less than the total force provided to move the indicating element to the indicating position.

Yet another object of the invention is to provide such a device wherein the indicating element is successively released for rotation to different rotational orientations to indicate the attainment successively increasing temperatures.

A further object of the invention is to provide a method of gravitationally placing a fusible locking member in a mechanism designed to lock an indicating element against rotational movement until a predetermined temperature is reached.

These and other objects and the detailed construction of the invention will become more apparent when viewed in light of the accompanying drawings and following description.

BRIEF DESCRIPTION OF THE DRAWINGS

FIG. 7 is an axial sectional view of a third embodiment of the device, with the indicating member in the fully preset locked position.

FIG. 8 is a plan view of the third embodiment taken on the plane designated by lines 8—8 of FIG. 7.

FIG. 9 is a cross-sectional view of the first locking mechanism employed in the third embodiment, taken along the plane designated by lines 9—9 of FIG. 7.

FIG. 10 is a cross-sectional view of the second locking mechanism employed in the third embodiment, taken along the plane designated by lines 10—10 of FIG. 7.

FIG. 11 is a cross-sectional view of the third embodiment taken along the plane corresponding to that designated by lines 9—9 of FIG. 7, but showing the first locking mechanism in a released condition.

FIG. 12 is an exploded perspective view of the third embodiment, with parts thereof broken away and shown in section, illustrating the assembly of the nesting elements employed in the first and second locking mechanisms.

DESCRIPTION OF THE ILLUSTRATED EMBODIMENTS

The First Embodiment

Figure 1:
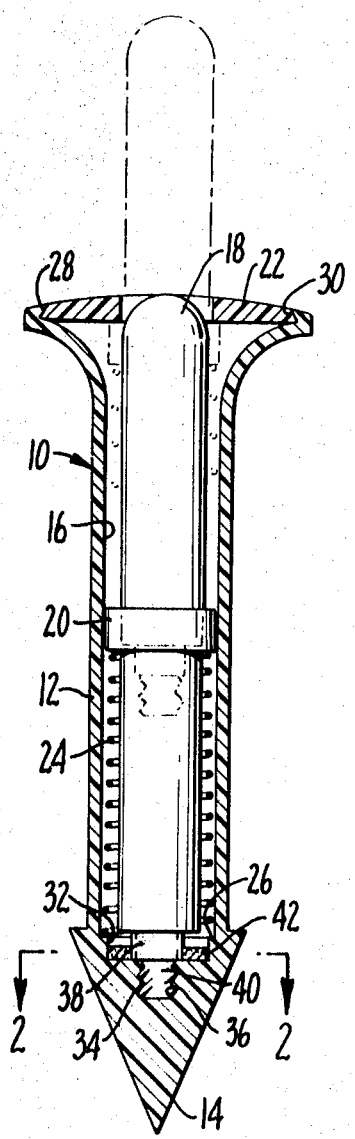
FIG. 1 is a view in axial section of a first embodiment of the device with the extensible indicating member employed therein shown in its retracted position in solid line representation and in an extended indicating position in phantom line representation.

Referring now to FIGS. 1 to 4, the signaling device therein is designated in its entirety by the numeral 10. The device comprises, as its basic elements: a tubular housing 12 having a closed barbed point 14 at one end thereof and defining an axially extending passage 16 opening through the other end thereof; an indicating rod 18 slidably received within the passage 16 for rotational and axial movement within the passage 16, said rod having a collar 20 fixed thereto and extending therearound; an annular cap 22 securely received within the open end of the passage 16 for slidable receipt of the rod 18 and abutment with the collar 20 upon extension of the rod to the phantom line position illustrated in FIG. 1; and, a compression coil spring 24 interposed between the collar 20 and a shoulder 26 formed within the passage 16. The spring 24 functions to normally urge the rod 18 to the extended position. The housing 12, rod 18 and cap 22 are all preferably formed of a relatively heat resistant plastic material, such as nylon. The cap is formed with an inclined outer edge 28 which is retained in place beneath a mating lip 30 formed around and interiorly of the open end of the housing. In assembly, the cap is snapped into this position by forcing it into place so as to slightly deflect both the cap and housing as the edge 28 passes beneath the lip 30.

The lower end of the passage 16 is formed with a generally rectangular cavity 32 having a centrally disposed recess 34 extending downwardly therefrom. The recess 34 is of generally cylindrical configuration and formed with helical threads on its interior surface. The lower end of the rod 18 is formed with an integral extension having an upper section 38 of generally rectangular configuration and a lower section 40 of cylindrical section proportioned for receipt in the recess 34. The section 40 is provided with external helical threads 36 matable with the internal threads of the recess. The upper section 38 is proportioned for relatively loose receipt in the cavity 32 so that it may turn therein.

The helical threads on the interior of the recess 34 and exterior of the section 40 are of such a pitch as to impart rotation to the rod 18 relative to the housing 12 responsive to the force imparted by spring 24. Thus, when the rod is unrestrained against rotation relative to the housing, the spring functions to turn the rod through the mating helices so as to effect their disengagement and the extension of the rod. In this operation, the mating helical threads act as "cam surfaces." So long as the rod is locked against rotation relative to the housing, however, the threads function to secure the rod against axial extension relative to the housing.

To restrain the rod 18 against rotation relative to the housing 12, and thus lock the rod against extension as described in the foregoing discussion, a fusible element 42 is interposed between the section 38 and the cavity 32 (see FIG. 1). So long as it is in a solid state, this element is interposed between the external surfaces of the section 38 and the internal surfaces of the section 32 to lock the rod against rotation. In this condition, the external surfaces of the section and the internal surfaces of the cavity may be said to be in "opposition."

Figure 2:
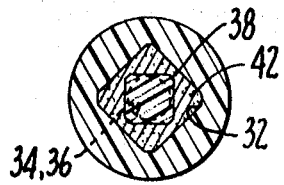
FIG. 2 is a cross-sectional view of the locking structure employed in the first embodiment taken along the plane designated by lines 2—2 in FIG. 1.
Figure 3:
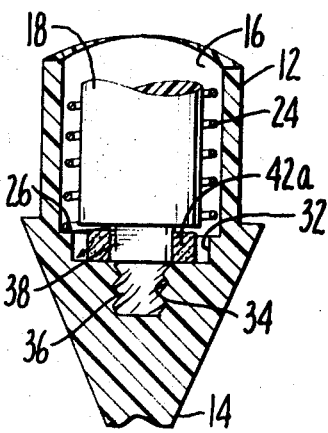
FIG. 3 is an exploded perspective view of the first embodiment, with parts thereof broken away and shown in section, illustrating the components of the device prior to the forming of the fusible locking element.
Figure 4:
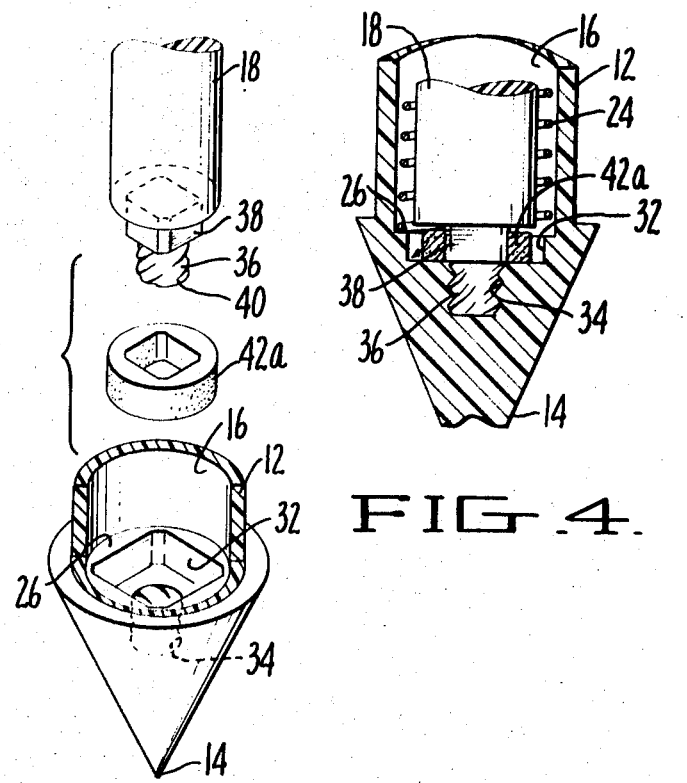
FIG. 4 is a partial view, in axial section, of the assembled first embodiment prior to the forming of the locking element, with the locking element shown in phantom.

The fusible element 42 is positioned to assume the generally rectangular configuration illustrated in FIGS. 1 and 2 through a gravity flow process. This may best be seen from FIGS. 3 and 4. In these figures, a ring of fusible material from which the element 42 is ultimately formed is designated by the numeral 42a. This ring is initially assembled into position between the section 38 and the cavity 32 (see FIG. 4). Once so assembled, it is formed into the final shape of the element 42 by heating the housing 12 to the fusion temperature of the material making up the ring and then cooling the housing to the point where the material once again solidifies. This operation is carried on with the housing in an upright position, as seen in FIG. 4. Thus, the material flows into the interstices between the section 38 and the cavity 32 under the influence of gravity. It is here noted that the section 38 may be said to nest in the cavity 32 when in the assembled condition. The ring 42a is formed so as not to interfere with this nesting.

To initially prepare the FIG. 1 embodiment for assembly, the rod 18, spring 24 and ring 42a are first inserted into the housing and then cap 22 is snapped into place. Once so prepared, the rod is forced to the bottom of the cavity to threadably engage the section 40 in the recess 34, as seen in FIG. 4. Assembly is completed by heating the housing to melt the material of the ring 42a and then cooling the housing, as described in the foregoing discussion. Once thus prepared, the rod is locked in the retracted position.

In use, the element 42a functions to release the rod for extension whenever the housing is heated to the point where the material forming the element once again melts. Upon the latter occurrence, through the cam action of the mating helices, the spring 42 functions to rotate the rod to the point where the section 40 is completely disengaged from the recess. Once so disengaged, the spring effects direct axial movement of the rod to the extended position, as seen in phantom in FIG. 1.

The Second Embodiment

Figures 5, 6:
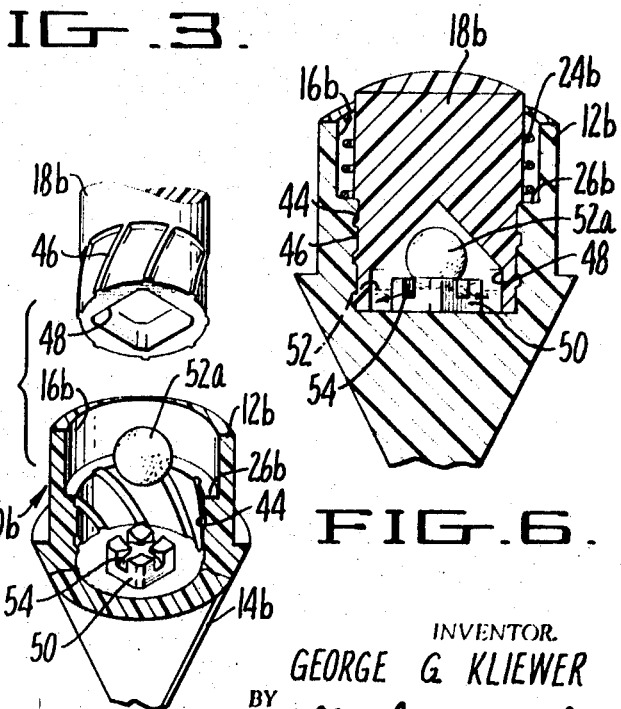
FIG. 5 is an exploded view, with parts thereof broken away and shown in section, illustrating a second embodiment of the device prior to the placement of the fusible locking element.
FIG. 6 is a partial view, in axial section, of the assembled second embodiment prior to the forming of the fusible locking element, with the formed locking element shown in phantom.

The second embodiment, as illustrated in FIGS. 5 and 6, differs from the first only in the specifics of the retention structure provided at the bottom of the housing. For this reason, only the lower end of the housing and rod are illustrated. The basic elements of the second embodiment corresponding to those of the first embodiment are designated by like numerals, followed by the subscript "b" as follows: housing 12b; point 14b; passage 16b; rod 18b; spring 24b; and, shoulder 26b. The second embodiment is designated in its entirety by the numeral 10b.

The threadably engageable helices on the housing 12b and rod 18b are designated, respectively, by the numerals 44 and 46. In operation, these helices function identically to those of the recess 34 and lower section 40 in the first embodiment. A cavity 48 of generally rectangular cross section opens through the lower end of the rod 18b and loosely receives a protrusion 50 formed integrally with the bottom of the passage 18b and extending upwardly therefrom. The relative proportions of the cavity 48 and protrusion 50 are such that the protrusion does not interfere with rotation of the rod. A fusible locking element 52 (see the phantom line representation in FIG. 6), however, is interposed between the protrusion and the cavity to normally lock the rod 18b against rotation relative to the housing. The element 52 functions in a manner substantially identical to that of the element 42. Upon its fusion, it similarly releases the rod 18b for rotation and, thus, permits extension of the rod to the indicating position.

The assembly technique employed for the second embodiment corresponds substantially to that of the first embodiment. In the second embodiment, however, the slug from which the element 52 is ultimately formed is initially of generally ball shaped configuration. This slug is designated by the numeral 52a. Ideally, it is proportioned so as to be too large to fall into the interstices between the lateral surfaces of the protrusion 50 and the interior of the threaded portion of the cavity 16b surrounding the protrusion. Thus, the slug is naturally supported on the upper surface of the protrusion upon being dropped into the housing. Ideally, the protrusion is formed with a generally concave upper surface so that the slug gravitates to a generally centrally disposed position thereon. Beneath this surface, as can be clearly seen from FIG. 5, channels 54 extend laterally through the sides of the protrusion. These channels direct the flow of fusible material upon melting of the slug. Thus, upon assembly of the device to the condition illustrated in FIG. 6, the element 52 may be positioned in a manner similarly to the aforedescribed positioning sequence for the element 42. Specifically, upon heating of the housing to the point where the slug 52a fuses, the material thereof flows into a ring interposed in the interstices between the cavity 48 and protrusion 50. Once so positioned, this ring is solidified by cooling the housing and, as a result, the rod is locked.

The operation of the second embodiment in performing its temperature indicating function corresponds identically to that described with respect to the first embodiment.

The Third Embodiment

Referring now to FIGS. 7 to 12, the third embodiment of the signaling device is designated in its entirety by the numeral 56. This device comprises, as its basic elements: a tubular housing 58 closed at one end by a barbed point 60 and having a passage 62 opening through the end thereof opposite the point; an indicating rod 64 rotatably received within the passage and having a collar 66 fixed to the lower end thereof and a laterally extending indicating needle 68 fixed to the upper end thereof; an intermediate locking member 70 rotatably received within the lower end of the passage 62 between the closed end thereof and the collar 66; a sleeve shaped cap 72 securely received within the open end of the passage 62 for rotatable receipt of the rod 74; and, a helical torsion spring 74 concentrically received around the rod 64 and having the opposite ends thereof secured, respectively, to the rod and the housing. The elements 58, 64, 66, 70 and 72 are all, preferably, fabricated of a tough relatively heat resistant plastic, such as nylon. The spring 74 is most commonly fabricated of steel. It should be understood that suitable recesses, designated 76 and 78, respectively, are provided in the rod and the housing for receipt of the opposite ends of the spring.

The cap 72 is formed with an annular locking rib 80 which cooperates with an annular locking recess 82 formed in the housing 58 to secure the cap in place. In assembly, the cap is simply forced axially into the passage 62 to the position shown in FIG. 1. During this operation, the cap and housing deflect slightly to permit the rib to pass through the passage to the position in opposition to the recess 82. Once in the latter position, the rib snaps into place within the recess to lock the cap to the housing.

The closed end of the passage 62 is formed with an arcuate recess 84 which loosely receives a protrusion 86 fixed to and extending from the locking member 70. The interrelationship of the recess and protrusion can best be seen from FIG. 10. A quantity of fusible material 88 is received within the recess to one side of the protrusion 84 to normally lock the protrusion against movement within the recess. This, in turn, locks the member 70 against rotation relative to the housing 58. The upper side of the member 70 and the lower end of the collar 66 (as viewed in FIG. 7) are similarly formed with an annular recess 90 and a protrusion 92. A volume of fusible material 94, having a fusion temperature different from the material 88, is also received within the recess 90 to normally lock the protrusion 92 against rotation relative to the member 70. This, in turn, locks the rod 64 against rotation relative to the member 70.

In the arrangement illustrated, the spring 74 is disposed to normally urge the rod for movement in a clockwise direction, as viewed from the top (see FIG. 8). The volumes of fusible material 88 and 94, as may be seen from FIGS. 9 and 10, are disposed to lock the rod 64 and member 70 against rotation by the spring until such time as their fusion temperature is reached. Upon the latter occurrence, each volume is displaceable by the protrusion in opposition thereto to permit the protrusion to move through approximately 90° of rotation. The degree of rotation is limited by the radially extending walls of the recesses 84 and 90. This may be seen from a comparison of FIGS. 9 and 11 wherein the protrusion 92 is shown before and after, respectively, fusion of the volume of material 94.

Because of the different fusion temperatures of the volumes 88 and 94, the volumes provide for the successive indication of increasing temperatures upon heating of the housing 58. This indication may be seen from observation of the needle 68. FIG. 8 illustrates the needle 68 in the position which it assumes prior to heating of the housing and shows indicia at the successive positions to which the needle moves upon melting of the volumes of fusible material. As illustrated, these indicia are shown as "RARE" and "MED." Such indicia might be employed where the device was intended to be used in the cooking of beef.

It should be understood that it is simply necessary that the volumes of material 88 and 94 melt at the successive temperatures desired to be indicated. The order of melting makes no difference, as each provides for movement of the needle through approximately 90°. Thus, the volume 88 might be chosen as the lower melting point material and the volume 94 as the higher melting point material, or vice versa.

In assembly, the volumes of fusible material 88 and 94 are preferably placed by a gravitational flow technique similar to that suggested for the first and second embodiments. With such a technique, a first slug of material would be dropped to the bottom of passage 62 so as to enter the recess 84 and the intermediate locking member 70 would then be dropped into place. After thus placing the member 70, a second slug of fusible material would be dropped into the housing so as to enter the recess 90 and then the subassembly made up of the rod 64, cap 72 and spring 74 would be inserted into the housing. During this initial insertion, the rod and cap would not be forced to the fully seated position illustrated in FIG. 7. Rather, the rod would simply be inserted and turned to a point wherein the protrusion 86 entered the recess 84 and the protrusion 92 entered the recess 90. With the protrusions and recesses so positioned, the housing would be heated to a degree sufficient to melt both slugs of alloy and then the rod would be turned to the full counterclockwise position illustrated in FIG. 8 while depressing the rod and cap to the fully seated position illustrated in FIG. 7. The latter operation would function to fully displace the molten material of the slugs to the final positions illustrated in FIGS. 9 and 10. Once so positioned, the housing would be cooled to a degree sufficient to solidify the fusible material and, thus, lock the indicator rod. At this point, the assembly would be complete and the device ready for use in the manner described in the foregoing discussion.

As a slightly modified alternative assembly technique, the slugs of fusible material 88 and 94 might first be placed so as to be initially disposed above the recesses 84 and 90, respectively. To facilitate this technique the slugs would initially be placed on the bottom of the passage 62 and the upper surface of the member 70, respectively. Any suitable placement means and slug form might be used. With the slugs so placed and the elements assembled into the housing the rod would be turned to the full counterclockwise position illustrated in FIG. 8 prior to heating of the housing. This could be accomplished because the material of the slugs would not be disposed so as to interfere with rotation of the protrusions 86 and 92 within the recesses 84 and 90, respectively. Once the rod was thus turned, the housing would be heated to the point where the slugs melted and flowed into the recesses 84 and 90 under the influence of gravity. In the latter condition the rod and cap would be depressed to the fully seated position and assembly would be completed by cooling the housing to a degree sufficient to solidify the fusible material. The latter operation would lock the indicator rod and thus ready the device for use.

From the foregoing description of the assembly techniques, it should be appreciated that the placement of the fusible material may be the function of displacement, as well as gravity. As illustrated, the protrusions are provided with a deliberate clearance with respect to the recesses in which they are received to facilitate initial displacement during the first described assembly, technique, as well as the displacement which occurs upon release.

The aforedescribed subassembly comprised of the rod 64, cap 72 and spring 74 may be assembled in any suitable manner. For example, it is anticipated that the spring and cap could be assembled over the rod prior to the formation of the needle 68 and that, once so assembled, the needle could be heat formed. During the assembly of the subassembly, one end of the spring 74 would be positioned in the recess 76 provided therefor in the rod. The other end of the spring would be positioned in the recess 78 provided therefor during the turning of the needle to its fully cocked position. By proper forming of the spring and the recess 78, this function would automatically occur upon turning of the needle to the position shown in FIG. 8. From the foregoing description, it is believed apparent that the present invention enables the attainment of the objects initially set forth herein. While the specific fusible material employed in the various embodiments has not been described in detail, it should be understood that it may take any suitable form. For example, it is anticipated that the material might take the form of an alloy, as suggested in my aforenoted U.S. Pat. Nos. 3,140,611 and 3,280,629, or the form of an organic compound such as suggested in my copending application Ser. No. 801,362 filed Feb. 24, 1969, now U.S. Pat. No. 3,548,780. The devices permit the use of a wide variety of materials, because the materials are not required to sustain appreciable shear or tension forces. It is noted that in the first and second embodiments, the helical threads provide the primary resistance to the actuating springs, while in the third embodiment the fusible material is held in compression for locking purposes.

What is claimed is:

1. A temperature indicating device comprising:
   a. a tubular housing, closed at one end;
   b. a rod received in the housing for rotation relative thereto about an axis with the attainment of predetermined temperature being signalled by the angular orientation of the rod;
   c. rod positioning means disposed to normally bias the rod for generally rotational movement relative to said housing about said axis; and,
   d. first locking means comprising:
      1. a member received within the housing for rotation relative thereto about said axis responsive to the rod positioning means, said member having a first chamber therein opening into the interior of said housing, said chamber having first and second end walls spaced angularly relative to one another about said axis;
      2. a first protrusion on the rod, said first protrusion extending into said first chamber for rotational movement relative thereto about said axis and having first and second abutment surfaces on generally opposite sides thereof for abutment, respectively, with the first and second end walls of said first chamber to limit rotational movement of the rod relative to the member in either direction; and, 3. a first fusible element disposed within said first chamber in interposed relationship between the first end wall of said first chamber and the first abutment surface of said first protrusion to normally maintain said wall and surface in spaced relationship, said first fusible element upon fusion, being displaceable by said first protrusion responsive to the rod positioning means to permit the rod to rotate to a position wherein said first end wall and first abutment surface abut; and, e. second locking means to normally restrain the member against rotation relative to the housing, said second locking means comprising:

1. a second chamber disposed within the closed end of the housing and opening into the interior thereof, said second chamber having first and second end walls spaced angularly relative to one another about said axis;

2. a second protrusion, said second protrusion being on said member and extending into the second chamber for rotational movement relative thereto about said axis, said second protrusion having first and second abutment surfaces on generally opposite sides thereof for abutment, respectively, with the first and second end walls of the second chamber to limit rotational movement of said member relative to the housing in either direction; and, 3. a second fusible element disposed within the second chamber in interposed relationship between the first end wall of the second chamber and the first abutment surface of the second protrusion to normally maintain said wall and surface in spaced relationship, said second fusible element, upon fusion, being displaceable by the second protrusion responsive to the rod positioning means to permit said member to rotate to a position wherein the first end wall of said second chamber and the first abutment surface of said second protrusion abut.

* * * * *